April 8, 1930.   R. A. WEINHARDT   1,753,489
MOTOR VEHICLE SUSPENSION
Filed March 4, 1926   2 Sheets-Sheet 1
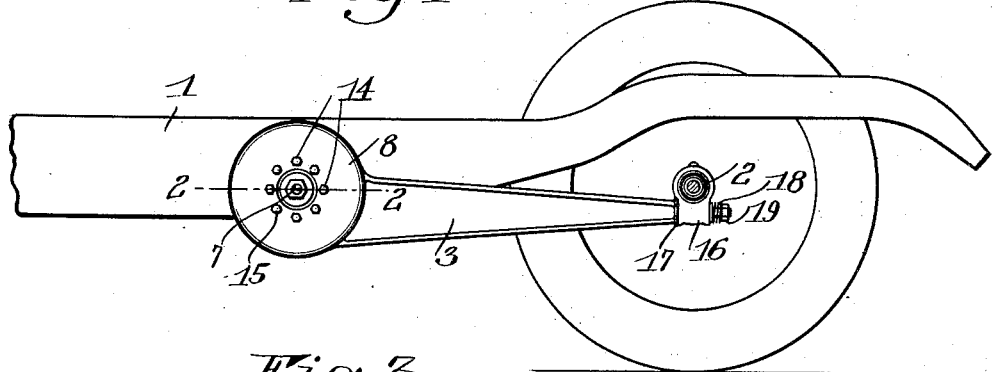
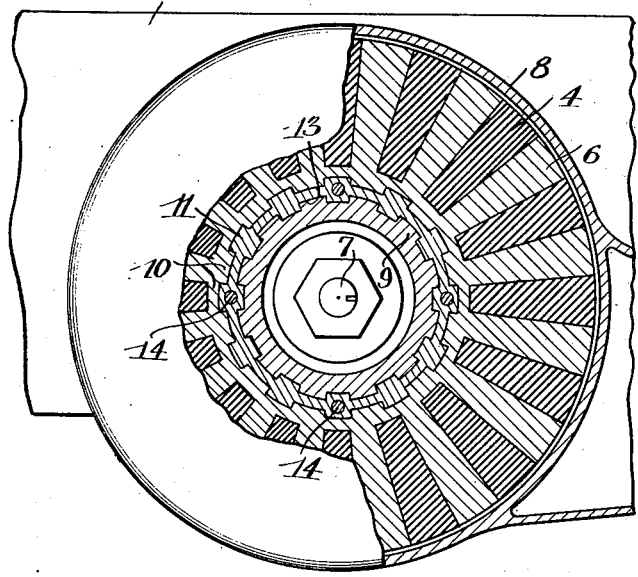
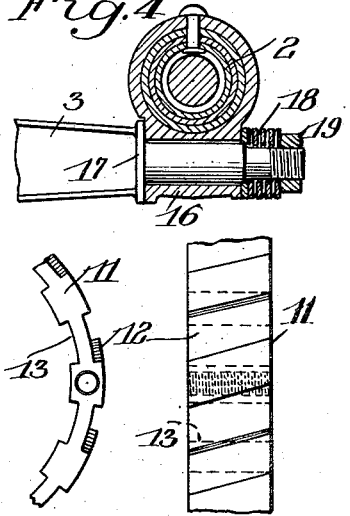
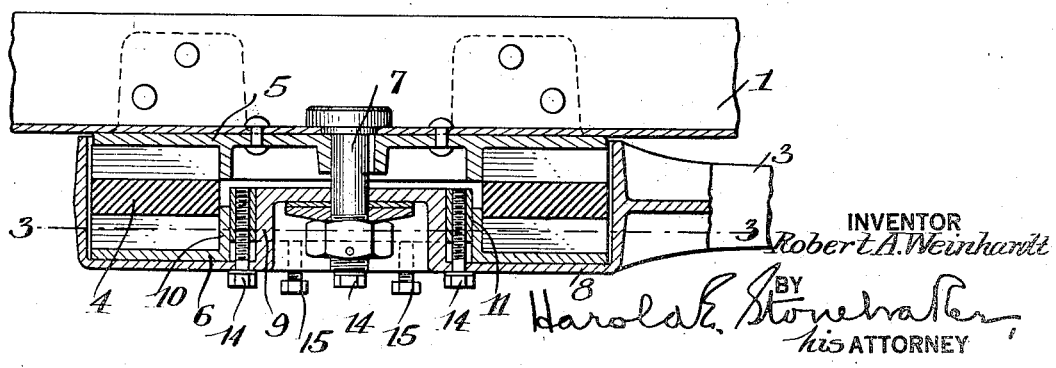
INVENTOR
Robert A. Weinhardt
BY Harold E. Stonebraker
his ATTORNEY

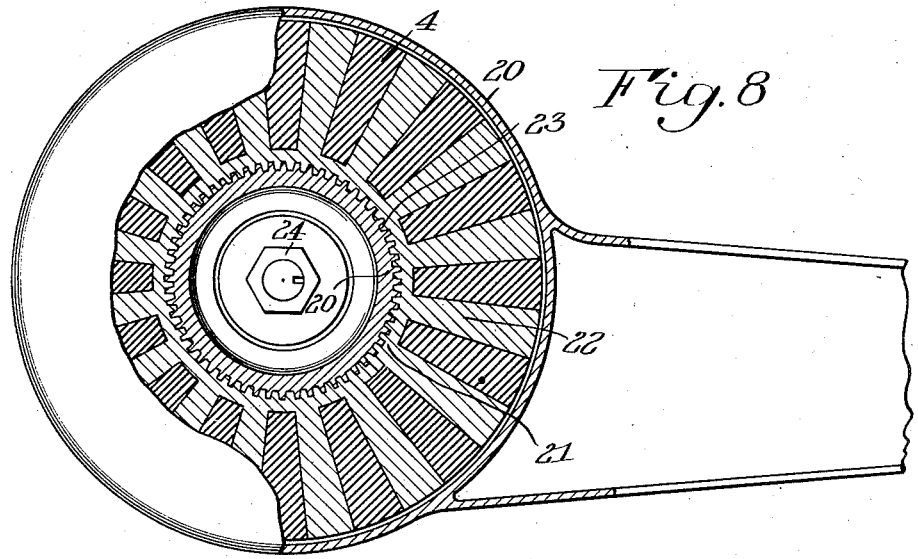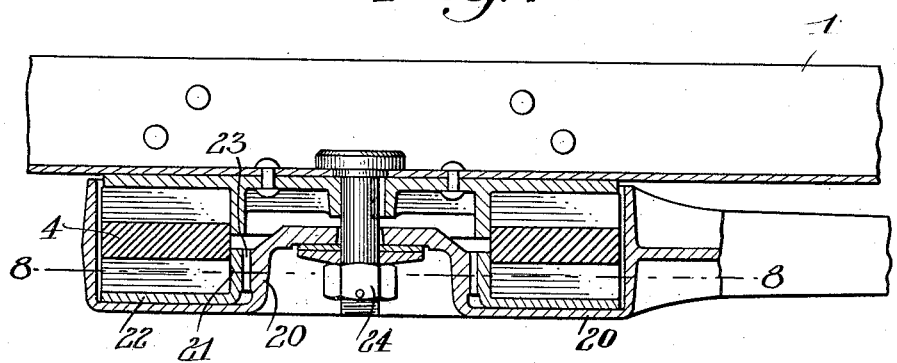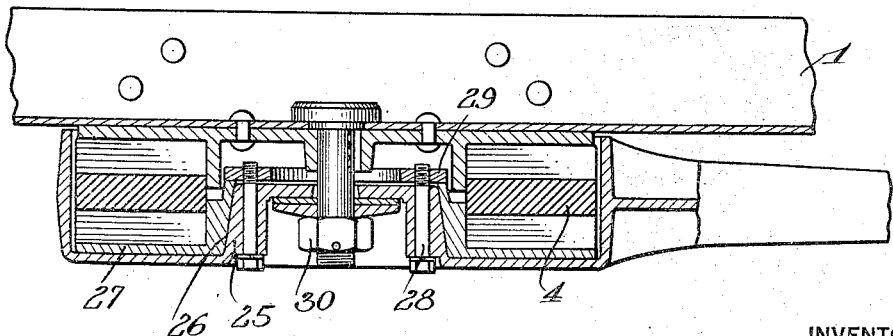

Patented Apr. 8, 1930                                                   1,753,489

UNITED STATES PATENT OFFICE

ROBERT A. WEINHARDT, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE SUSPENSION

Application filed March 4, 1926. Serial No. 92,254.

This invention relates to a motor vehicle, and particularly to the general type of suspension illustrated in Patent No. 1,515,716, November 18, 1924, in which an arm is connected at one end to an axle and at its opposite end to a portion of a frame through a rubber block having rib and groove connection with the connecting arm and frame, and clamped therebetween.

A principal object of the invention is to afford means that permits a fine adjustment between the connecting arm and the frame, so as to change slightly their normal relationship without disengaging the interposed rubber block.

A further purpose of the invention is to provide a practicable and easily manipulated mechanism such that the connecting arm can readily be set to a nicety in any desired angular relation to the frame when assembling or setting up the motor vehicle.

In its specific aspect, the invention has for its object to provide adjustable connecting means between either the arm or frame, and the rubber block retainer supported thereby, so as to vary the relative position of said retainer and its supporting member.

Another object of the invention is to provide a simple and efficient connection between the arm and axle so as to permit a certain amount of play or flexibility of the arm relatively to the axle.

To these ends, the invention comprises the construction and arrangement of parts that will appear clearly from the following description when read in conjunction with the accompanying drawings, the novel features being pointed out in the claims following the description.

In the drawings:

Figure 1 is a side elevation of part of a motor vehicle frame showing the general application thereto of one embodiment of the invention;

Figure 2 is a horizontal sectional view on line 2—2 of Figure 1;

Figure 3 is a vertical sectional view on line 3—3 of Figure 2;

Figure 4 is a detail sectional view of the connection between the axle and arm;

Figure 5 is a partial plan view of the adjusting ring forming part of the construction of Figures 2 and 3;

Figure 6 is a partial side elevation of the same;

Figure 7 is a horizontal sectional view taken centrally, and illustrating a modified adaptation of the invention;

Figure 8 is a vertical sectional view on line 8—8 of Figure 7, and

Figure 9 is a horizontal sectional view taken in a plane similar to Figure 7, and illustrating an additional modification.

Referring more particularly to the drawings in which like reference numerals refer to corresponding parts in the several views, Figures 1 to 6 illustrate one embodiment of the invention, including a frame consisting of side members 1, and axle 2, while 3 is an arm connecting the axle and frame through the rubber block 4 that is clamped therebetween.

The rubber block 4 is preferably circular and provided on its opposite faces with ribs and grooves that are engaged by corresponding ribs and grooves on circular retainers mounted on the side member 1 and connecting arm 3 respectively. To this end, the side member 1 of the frame has riveted thereto the retainer 5, while 6 designates the retainer carried by the connecting arm 3, and adapted to turn on the bearing pin 7 that extends centrally through the rubber block and retainers and serves to hold the parts in assembled relationship.

In setting up such a motor vehicle suspension, it is often desirable to obtain an adjustment between the connecting arm and frame without disengaging the rubber block, or to obtain a finer adjustment than is possible with the rubber block itself. To accomplish this, one of the rubber block retainers is adjustably mounted on its support. In the illustrated embodiment, the connecting arm has been chosen as the one for permitting the desired adjustment, and in the construction of Figures 1 to 6, the retainer 6 previously referred to is adjustably mounted within the circular housing 8 of the connecting arm and can be turned concentrically with reference thereto through the following means.

The housing 8 is provided with a central bearing portion or extension 9, while retainer 6 carries the inwardly projecting flange 10. Between bearing portion 9 and flange 10 is interposed an adjusting ring 11 which is provided on its outer periphery with diagonal slots 12 engaging corresponding teeth on the flange 10, while on the inner periphery of the adjusting ring 11 are straight or axial slots or grooves 13 engaging corresponding teeth on the bearing portion 9 of the housing 8. When the adjusting ring 11 is moved axially, it produces relative concentric movement between housing 8 and retainer 6, due to the straight and diagonal slots on the inner and outer peripheries of the adjusting ring, and its axial movement is accomplished in the following manner.

14 designate a series of bolts which extend through the face of housing 8 and are threaded into the adjusting ring 11, while 15 designate a second series of adjusting bolts which are threaded in the face of housing 8 and arranged to engage the adjacent edge of the adjusting ring. By turning the bolts 15 inwardly, the adjusting ring is moved inwardly by contact of the bolts 15 with its edge, and by turning the bolts 14 in the proper direction, the adjusting ring can be drawn outwardly. Obviously, before bolts 14 can be operated to draw the adjusting ring 11 outwardly, bolts 15 must first be disengaged from the edge of the adjusting ring to allow the necessary movement of the latter, and likewise, when the adjusting ring is to be moved inwardly, the bolts 14 must first be withdrawn from the adjusting ring far enough to permit the desired inward movement when the bolts 15 are actuated.

When the adjusting ring is in its final adjusted position, both sets of bolts are in the position shown in Figure 2, one set of bolts 15 acting in opposition to the other bolts 14 and thereby locking the adjusting ring in the position in which it is set. After the desired adjustment is obtained, the threaded nut on center pin 7 is tightened to clamp the retainers into rigid engagement with the interposed rubber block. If angular adjustment of the connecting arm with reference to the frame is desired at any time, it is accomplished by first loosening the nut on pin 7 and then proceeding to operate bolts 14 and 15 in the manner already described, moving the adjusting ring 11 either inwardly or outwardly depending on the direction in which adjustment is desired.

In order to allow greater flexibility and freedom of movement between the axle and frame, the arm 3 is connected to the axle so as to permit yielding of the arm transversely of the axle under irregular movements of the latter. This is accomplished by the structure shown in Figure 4, which includes a boss 16, provided with a bearing for the end of arm 3 and abutting at its inner end against a flange 17 on the arm. 18 designates a spring located between the outer end of the boss 16 and a nut 19 which retains the parts in the assembled relation shown, the spring 18 permitting slight movement of the connecting arm 3 transversely of the axle.

Figures 7 and 8 illustrate a modified arrangement of adjusting means between the connecting arm and its rubber block retainer, and in the construction here illustrated, the bearing portion 20 on the connecting arm housing, and likewise the flange 21 on the retainer 22, are provided with small meshing teeth 23, and to obtain a concentric adjustment of these parts, nut 24 is removed to permit the connecting arm and its housing to be moved axially until the teeth on bearing portion 20 are disengaged from the grooves on flange 21. Then by turning the bearing portion 20 through a distance of one tooth or more, and reengaging it with the flange 21, the necessary adjustment can be had.

Still another way of accomplishing this is illustrated in Figure 9, in which the central bearing portion 25 of the connecting arm is provided with a tapered or conical surface 26 that cooperates with a corresponding tapered surface on the retainer 27. The parts just referred to are held in frictional engagement with each other by a series of bolts 28 that are threaded into a plate 29 abutting the inner edge of the flange on the retainer 27. To effect the necessary adjustment with this construction, the nut 30 is first loosened to release the parts, and bolts 28 are then loosened to permit the desired amount of turning between the bearing portion 25 on the connecting arm and the flange on retainer 27, after which the bolts 28 and nut 30 are successively tightened to hold the parts in their adjusted relationship.

While the invention has been described with reference to certain particular forms and details of construction, it is not restricted to the arrangement set forth, and this application is intended to cover any other modifications or departures that may come within the underlying purposes of the invention or the scope of the following claims.

I claim:

1. The combination with a motor vehicle frame and axle, of an arm connected at one end to the axle, a rubber block, retainers mounted on the frame and arm and having groove and rib connection with said rubber block, and an adjusting ring having axially and diagonally arranged grooves on its inner and outer peripheries respectively engaging corresponding teeth on one of said retainers and its support, said ring being movable axially of the rubber block to effect a concentric relative adjustment between said retainer and its support.

2. The combination with a motor vehicle frame and axle, of an arm connected at one end to the axle, a rubber block, retainers mounted on the frame and arm and having groove and rib connection with said rubber block, an adjusting ring having axially and diagonally arranged grooves on its inner and outer peripheries respectively engaging corresponding teeth on one of said retainers and its support, and means for effecting axial movement of the adjusting ring in either direction and for locking it in adjusted position.

3. In a motor vehicle, the combination with a frame and axle, of an arm, a rubber block having groove and rib connection with the frame and arm and clamped therebetween permitting a rocking movement of the arm relatively to the frame, a boss on the axle in which the end of the arm is revolubly mounted, a shoulder on the arm abutting one end of the boss, a spring surrounding the arm and engaging the opposite end of the boss, and means for retaining the spring on the arm against the boss.

4. The combination with a motor vehicle frame and axle, of an arm connected at one end to the axle, a rubber block, retainers mounted on the frame and arm and having groove and rib connection with said rubber block, an adjusting ring having axially and diagonally arranged grooves on its inner and outer peripheries respectively engaging corresponding diagonally arranged teeth on one of said retainers and its support, adjusting bolts carried by the support and having threaded engagement with the adjusting ring for drawing the latter outwardly, and other adjusting bolts having threaded engagement with the support and contacting with one edge of the adjusting ring for moving the latter inwardly.

In witness whereof, I have hereunto signed my name.

ROBERT A. WEINHARDT.